(12) United States Patent
Sewak et al.

(10) Patent No.: US 10,831,821 B2
(45) Date of Patent: Nov. 10, 2020

(54) COGNITIVE ADAPTIVE REAL-TIME PICTORIAL SUMMARY SCENES

(71) Applicant: INTERNATIONAL BUSINESS MACHINES CORPORATION, Armonk, NY (US)

(72) Inventors: Mohit Sewak, Lucknow (IN); Mandar Mutalikdesai, Bengaluru (IN); Sachchidanand Singh, Pune (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 48 days.

(21) Appl. No.: 16/138,284

(22) Filed: Sep. 21, 2018

(65) Prior Publication Data

US 2020/0097569 A1     Mar. 26, 2020

(51) Int. Cl.
| | |
|---|---|
| *G06F 16/00* | (2019.01) |
| *G06F 16/583* | (2019.01) |
| *G06F 3/0485* | (2013.01) |
| *G06T 3/40* | (2006.01) |
| *G06K 9/00* | (2006.01) |
| *G06N 3/08* | (2006.01) |
| *G06K 9/72* | (2006.01) |
| *G06F 16/738* | (2019.01) |
| *G06F 40/30* | (2020.01) |
| *G06F 40/106* | (2020.01) |

(Continued)

(52) U.S. Cl.
CPC ........ *G06F 16/5846* (2019.01); *G06F 3/0485* (2013.01); *G06F 16/739* (2019.01); *G06F 40/106* (2020.01); *G06F 40/30* (2020.01); *G06K 9/00469* (2013.01); *G06K 9/726* (2013.01); *G06N 3/08* (2013.01); *G06T 3/4038* (2013.01); *G06F 3/04842* (2013.01); *G06K 9/628* (2013.01); *G06K 2209/27* (2013.01)

(58) Field of Classification Search
CPC .................................................... G06F 16/345
See application file for complete search history.

(56) References Cited

U.S. PATENT DOCUMENTS

| | | | |
|---|---|---|---|
| 9,529,869 B2 | 12/2016 | Della Corte et al. | |
| 9,836,671 B2* | 12/2017 | Gao | G06F 16/3347 |

(Continued)

FOREIGN PATENT DOCUMENTS

KR     1020170004154     7/2015

OTHER PUBLICATIONS

Shah et al., "ATLAS: Automatic Temporal Segmentation and Annotation of Lecture Videos Based on Modelling Transition Time" MM '14, Nov. 2014, Orlando, Florida, USA, Copyright 2014 ACM, p. 209-212. (Year: 2014).*

(Continued)

*Primary Examiner* — Amelia L Tapp
(74) *Attorney, Agent, or Firm* — Nicholas Bowman; Andrew D. Wright; Roberts, Calderon, Safran & Cole, P.C.

(57) ABSTRACT

Methods and systems for generating cognitive real-time pictorial summary scenes are disclosed. A method includes: obtaining, by a computing device, a document; training, by the computing device, computer models using natural language processing and deep learning based computer vision; and creating, by the computing device, a first pictorial summary scene that summarizes the document using the computer models.

12 Claims, 7 Drawing Sheets

(51) Int. Cl.
*G06F 3/0484* (2013.01)
*G06K 9/62* (2006.01)

(56) References Cited

U.S. PATENT DOCUMENTS

| | | | | |
|---|---|---|---|---|
| 10,311,913 | B1* | 6/2019 | Shekhar | G06K 9/00718 |
| 10,445,356 | B1* | 10/2019 | Mugan | G06N 3/08 |
| 10,474,709 | B2* | 11/2019 | Paulus | G06N 3/006 |
| 2007/0136680 | A1* | 6/2007 | Skrenta | G06F 16/4393 |
| | | | | 715/780 |
| 2012/0210203 | A1* | 8/2012 | Kandekar | G06F 17/241 |
| | | | | 715/230 |
| 2017/0098324 | A1* | 4/2017 | Srinivasan | G10L 13/08 |
| 2017/0139955 | A1 | 5/2017 | Dutta et al. | |
| 2018/0018349 | A1* | 1/2018 | Liu | G06F 16/951 |
| 2018/0300771 | A1* | 10/2018 | Roger | G06F 16/958 |

OTHER PUBLICATIONS

Lew et al., "Content-Based Multimedia Information Retrieval: State of the Art and Challenges" ACM Transactions on Multimedia Computing, Communications and Applications, vol. 2, No. 1, Feb. 2006, pp. 1-19. (Year: 2006).*

Li et al., "Joint Image-Text News Topic Detection and Tracking by Multimodal Topic and-or Graph", IEEE Transactions on Multimedia, vol. 19, Issue: 2, Feb. 2017, Oct. 16, 2016, 16 pages.

Anonymous, "Summary of 'Sensitivity enhancement in magnetic particle imaging by background subtraction'", 2015 IEEE Nuclear Science Symposium and Medical Imaging Conference (NSS/MIC), San Diego, CA, 2015, pp. 1-2, 2 pages.

Ushanandhini et al., "Classification of high spatial resolution images using semantic allocation level-probabilistic topic model", 2016 International Conference on Recent Trends in Information Technology (ICRTIT), Chennai, 2016, pp. 1-6, 6 pages.

Jurrus et al., "Adaptive visual sort and summary of micrographic images of nanoparticles for forensic analysis", 2016 IEEE Symposium on Technologies for Homeland Security (HST), Waltham, MA, 2016, pp. 1-6, 6 pages.

Shirota et al., "Visualization for University Brand Image Clustering by Simple Topic Model", 2016 5th IIAI International Congress on Advanced Applied Informatics (IIAI-AAI), Kumamoto, 2016, pp. 474-477, 4 pages.

Chen et al., "Using business-aware latent topics for image captioning in social media", 2016 IEEE International Conference on Multimedia and Expo (ICME), Seattle, WA, 2016, pp. 1-6, 6 pages.

Bryan et al., "Temporal Summary Images: An Approach to Narrative Visualization via Interactive Annotation Generation and Placement", IEEE Transactions on Visualization and Computer Graphics, vol. 23, No. 1, pp. 511-520, Jan. 2017, 10 pages.

Li et al., "A More Effective Method for Image Representation: Topic Model Based on Latent Dirichlet Allocation", 2015 14th International Conference on Computer-Aided Design and Computer Graphics (CAD/Graphics), Xi'an, 2015, pp. 143-148, 6 pages.

Tu et al., "Semantic Image Retrieval Using Correspondence Topic Model with Background Distribution", 2016 International Conference on Big Data and Smart Computing (BigComp), Hong Kong, 2016, pp. 191-198, 8 pages.

Sharma et al., "Image Summarization using Topic Modelling", 2015 IEEE International Conference on Signal and Image Processing Applications (ICSIPA), Kuala Lumpur, 2015, pp. 226-231, 6 pages.

Liu, "Contextual Topic Model Based Image Recommendation System", 2015 IEEE/WIC/ACM International Conference on Web Intelligence and Intelligent Agent Technology (WI-IAT), Singapore, 2015, pp. 239-240, 2 pages.

He et al., "Landslide detection with two satellite images of different spatial resolutions in a probabilistic topic model", 2015 IEEE International Geoscience and Remote Sensing Symposium (IGARSS), Milan, 2015, pp. 409-412, 4 pages.

Cui et al., "Tagged image clustering via topic models", The 27th Chinese Control and Decision Conference (2015 CCDC), Qingdao, 2015, pp. 4424-4429, 6 pages.

Herodotou et al., "A color segmentation and classification scheme for facial image and video retrieval extended summary", 9th European Signal Processing Conference (EUSIPCO 1998), Rhodes, 1998, pp. 1-3, 3 pages.

Zewdie et al., "A new pooling strategy for image quality metrics: Five number summary", 2014 5th European Workshop on Visual Information Processing (EUVIP), Paris, 2014, pp. 1-6, 6 pages.

Kim et al., "Generating summaries for photographic images based on human affects", 2015 IEEE 14th International Conference on Cognitive Informatics & Cognitive Computing (ICCI*CC), Beijing, 2015, pp. 360-367, 8 pages.

Chen et al., "Exploitation and Exploration Balanced Hierarchical Summary for Landmark Images", IEEE Transactions on Multimedia, vol. 17, No. 10, pp. 1773-1786, Oct. 2015, 14 pages.

Chen et al., "Modeling Latent Topics and Temporal Distance for Story Segmentation of Broadcast News", IEEE/ACM Transactions on Audio, Speech, and Language Processing, vol. 25, No. 1, pp. 112-123, Jan. 2017, 11 pages.

* cited by examiner

COGNITIVE ADAPTIVE REAL-TIME PICTORIAL SUMMARY SCENES

BACKGROUND

The present invention generally relates to computing devices and, more particularly, to methods and systems for generating cognitive adaptive real-time pictorial summary scenes.

Text-based data visualization techniques are used to reduce the cognitive load of reading textual data to extract information by presenting a graphical visualization of a body of text. These techniques include word-clouds, word-nets, heatmaps, color filters, and geo-maps, among others.

SUMMARY

In a first aspect of the invention, there is a method that includes: obtaining, by a computing device, a document; training, by the computing device, computer models using natural language processing and deep learning based computer vision; and creating, by the computing device, a first pictorial summary scene that summarizes the document using the computer models.

In another aspect of the invention, there is a computer program product that includes a computer readable storage medium having program instructions embodied therewith. The program instructions are executable by a computing device to cause the computing device to: obtain a document; obtain information indicating a current user position in the document; train computer models using natural language processing and deep learning based computer vision; create a first pictorial summary scene that summarizes the document using the computer models; and create a second pictorial summary scene that summarizes a portion of the document adjacent to the current user position using the computer models.

In another aspect of the invention, there is a system that includes: a hardware processor, a computer readable memory, and a computer readable storage medium associated with a computing device; program instructions configured to obtain a document; program instructions configured to train computer models using natural language processing and deep learning based computer vision; and program instructions configured to create a first pictorial summary scene that summarizes the document using the computer models, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
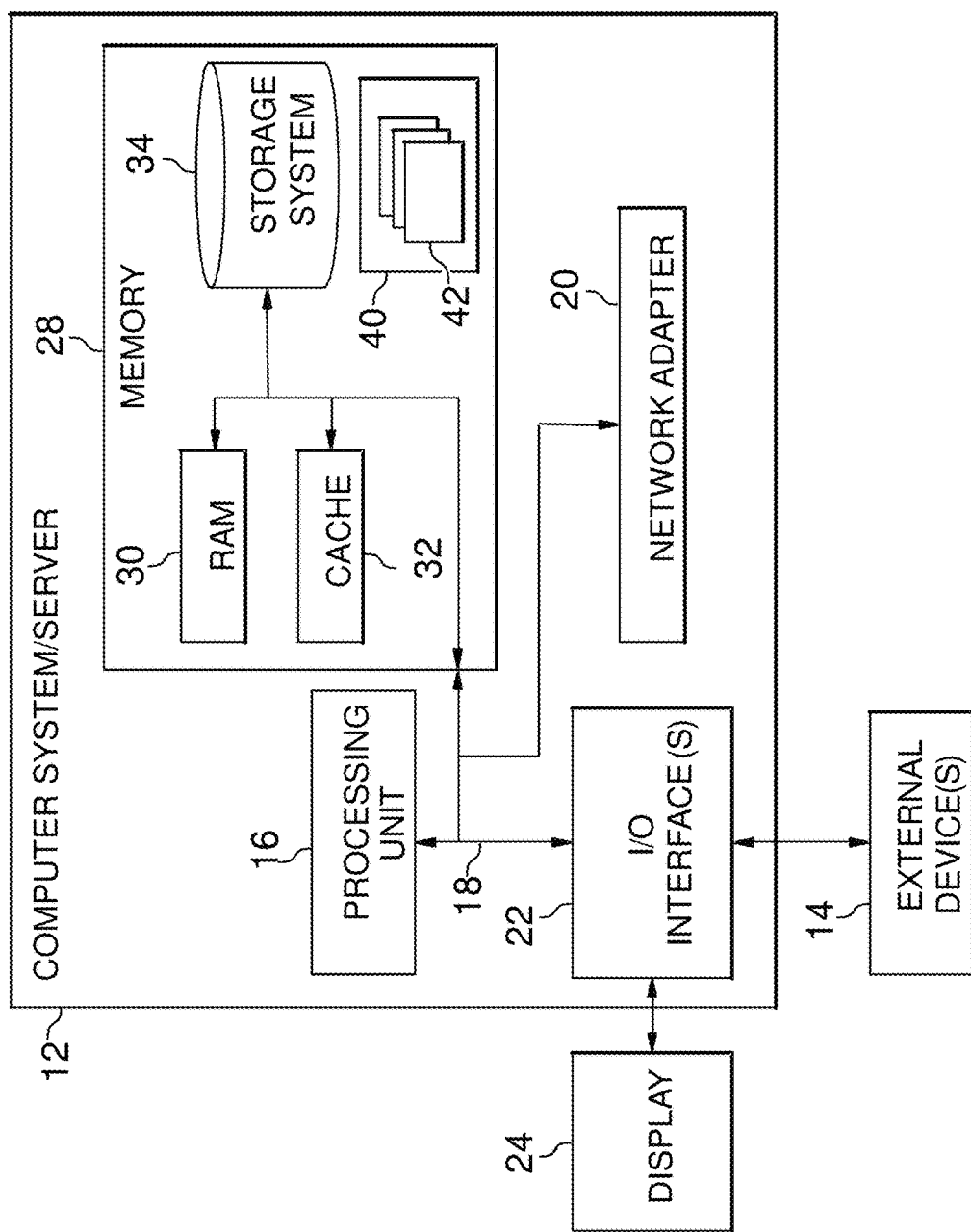
FIG. 1 depicts a computer system in accordance with aspects of the invention.

The present invention generally relates to computing devices and, more particularly, to methods and systems for generating cognitive adaptive real-time pictorial summary scenes. As described herein, aspects of the invention include a method and system that acquire a document text corpus, access a database of pictorial representations, train models using natural language processing and deep learning based computer vision, and generate and display a pictorial summary scene for the document.

In embodiments, the pictorial summary scene includes a combination of photos, images, clip art, sketches, and/or cartoons that is stitched (e.g., merged) together in a manner to tell a story or represent multiple key topics and sub-topics in a document in the form of a representative scene (image). In embodiments, a pictorial summary scene is generated that summarizes an entire text document and/or a portion of the text document that is being actively viewed by a user (e.g., as determined based upon a scroll position in the document or based upon a cursor position or pointer position indicating an active focus). The pictorial formats such as photos, images, clip art, cartoons, sketches, etc. are cognitively determined and intelligently stitched together, using techniques including artificial intelligence, deep learning, advanced natural language processing, cognitive computing, and computer vision.

In embodiments, a pictorial summary scene for a document is created in real time. In an example, for a document including terms such as cold drink, burger, fries, and adults, the pictorial summary scene includes an image of an adult consuming burgers. This pictorial summary scene is a more end-user friendly way of representing the topic of the document than mere words. In particular, the pictorial summary scene represents entities, concepts, and relations between entities and concepts in the document. In embodiments, the pictorial summary scene itself, as well as elements that make up the pictorial summary scene, are weighed (e.g., centered, sized, and/or numbered) with respect to the importance of the represented terms in the document.

In embodiments, a pictorial summary scene is generated in real time for a portion of the text document that is being actively viewed by a user, either instead of or in addition to the pictorial summary scene for the document as a whole. As the user scrolls within a document, the pictorial summary scene changes gradually based upon the topic in the portion of the document that is being actively viewed by the user.

In the above example, if a subsequent portion of the document that is now being actively viewed includes terms such as sedentary position, mobile, and video games, the previously described pictorial summary scene with the image of the adult consuming burgers gradually changes to a pictorial summary scene with an image of a similar adult playing a mobile video game in his house with burgers on a table nearby. Accordingly, the visual representations of the previous topic (e.g., burgers) slowly fade into the background.

In other embodiments, a pictorial summary scene may be generated based upon a corpus of documents. Such a scene may be generated based upon weights applied to the effects of different concepts in the different underlying documents. This pictorial summary scene representing a corpus of documents may be drilled down (e.g., by a user selecting one or more areas in the pictorial summary scene) to filter on and retrieve the respective underlying documents. The weighting/priority given to each of the documents may be uniform or may be based on a distance from a center of a selected area in the pictorial summary scene, or an amount of area in the selected portion of the pictorial summary scene, or the order of selection of the different sub parts of the pictorial summary scene that correspond to the underlying documents (e.g., vector-represented weighing). The selection within the pictorial summary scene can comprise noncontiguous areas, thereby offering insights from seemingly non-related concepts.

Embodiments improve the functioning of a computer by providing methods and systems for generating cognitive adaptive real-time pictorial summary scenes. In particular, embodiments improve software by providing an improved mechanism for acquiring a document text corpus, accessing a database of pictorial representations, training models using natural language processing and deep learning based computer vision, and generating and displaying a pictorial summary scene for the document. These software improvements related to generating and displaying the pictorial summary scene provide for the representation of text in a cognitively better and more informative manner, from which meaningful information is easily assimilated and absorbed in a minimum amount of time and with a smaller cognitive load. Additionally, implementations of the invention use techniques that are, by definition, rooted in computer technology (e.g., artificial intelligence, deep learning, advanced natural language processing, cognitive computing, and computer vision, etc.). For example, natural language processing includes using computers to process, understand, and interpret human languages. Computer vision includes using computers for the automatic extraction, analysis, and understanding of information from images.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
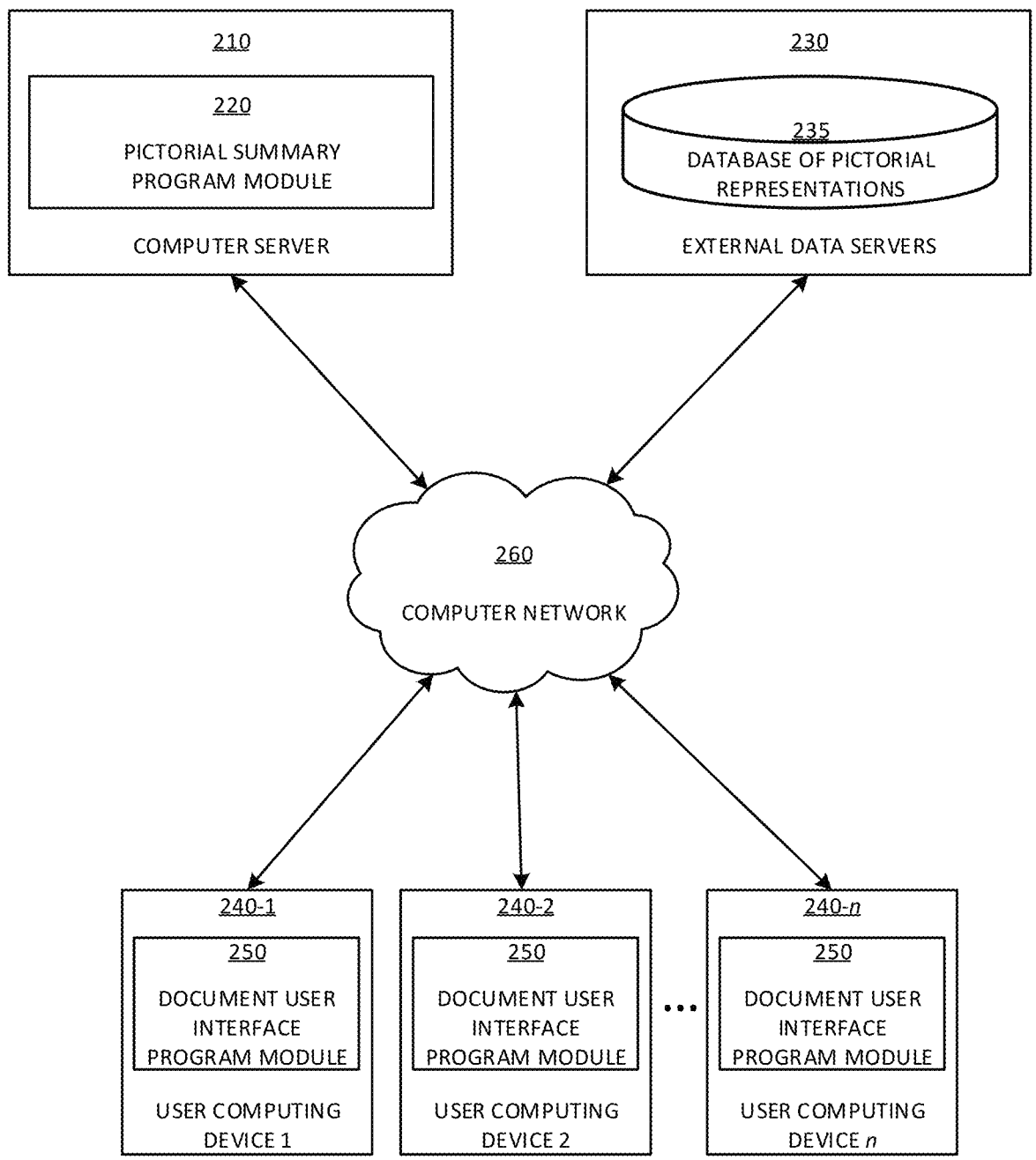
FIG. 2 depicts an illustrative environment in accordance with aspects of the invention.

FIG. 2 depicts an illustrative environment 200 in accordance with aspects of the invention. As shown, the environment 200 comprises a computer server 210, external data servers 230, and a plurality of user computing devices 240-1, 240-2, . . . , 240-n which are in communication via a computer network 260. In embodiments, the computer network 260 is any suitable network including any combination of a LAN, WAN, or the Internet. In embodiments, the computer server 210, the external data servers 230, and the user computing devices 240-1, 240-2, . . . , 240-n are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 is a computer device comprising one or more elements of the computer system/server 12 (as shown in FIG. 1). In particular, the computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 includes a pictorial summary program module 220, which includes hardware and/or software and is one or more of the program modules 42 shown in FIG. 1. According to an embodiment, the pictorial summary program module 220 includes program instructions for generating pictorial summary scenes. In embodiments, the program instructions included in the pictorial summary program module 220 of the computer server 210 are executed by one or more hardware processors.

Still referring to FIG. 2, the environment may include one or more of the external data servers 230. The external data servers 230 are computer devices comprising one or more elements of the computer system/server 12 (as shown in FIG. 1). In particular, the external data servers 230 are implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients. In embodiments, the external data servers 230 store a database of pictorial representations 235. Additionally, the external data servers 230 may store one or more documents.

Still referring to FIG. 2, in embodiments, each of the user computing devices 240-1, 240-2, . . . , 240-n is a computer device comprising one or more elements of the computer system/server 12 (as shown in FIG. 1) and is a desktop computer, a laptop computer, a mobile device such as a cellular phone, tablet, personal digital assistant (PDA), or other computing device. In other embodiments, each of the user computing devices 240-1, 240-2, . . . , 240-n is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, each of the user computing devices 240-1, 240-2, . . . , 240-n includes a document user interface program module 250, which includes hardware and/or software and is one or more of the program modules 42 shown in FIG. 1. According to an embodiment, the document user interface program module 250 includes program instructions for displaying one or more documents as well as pictorial summary scenes generated by the pictorial summary program module 220 of the computer server 210. In embodiments, the program instructions included in the document user interface program module 250 of the user computing devices 240-1, 240-2, . . . , 240-n are executed by one or more hardware processors.

Figure 3:
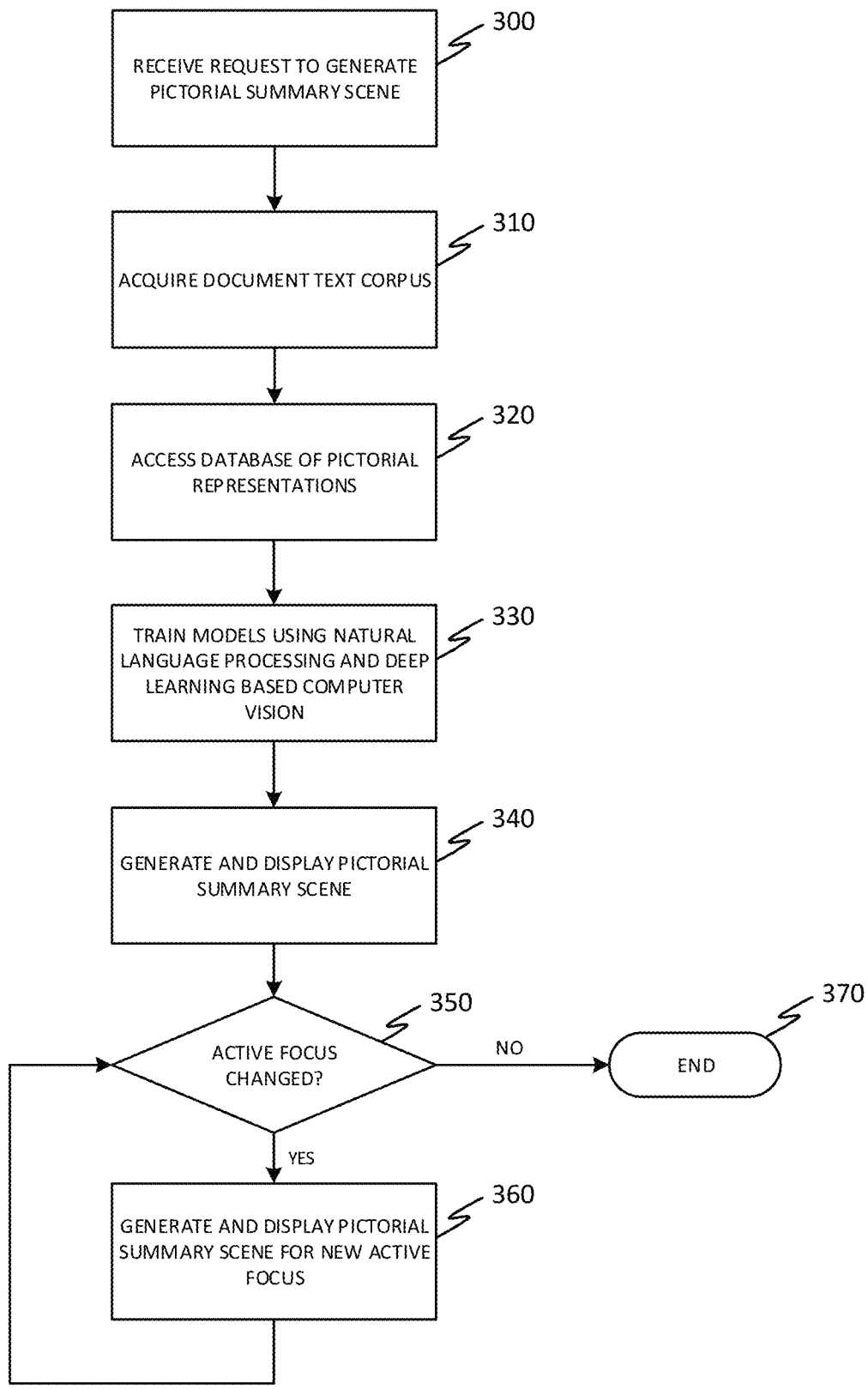
FIGS. 3, 4, 5, and 6 depict flowcharts of exemplary methods in accordance with aspects of the invention.

FIG. 3 depicts a flowchart of an exemplary method performed by the pictorial summary program module 220 of the computer server 210 in accordance with aspects of the invention. The steps of the method are performed in the environment of FIG. 2 and are described with reference to the elements shown in FIG. 2.

At step 300, the computer server 210 receives a request to generate a pictorial summary scene. In embodiments, the pictorial summary program module 220 receives, from the document user interface program module 250 running on one of the user computing devices 240-1, 240-2, . . . , 240-n, the request to generate the pictorial summary scene. In embodiments, the pictorial summary scene is an image that summarizes a document that is being displayed by the one of the user computing devices 240-1, 240-2, . . . , 240-n using the document user interface program module 250.

At step 310, the computer server 210 acquires a document text corpus. In embodiments, the pictorial summary program module 220 obtains the document text corpus from one or more of the external data servers 230, in response to the request received at step 300 from the one of the user computing devices 240-1, 240-2, . . . , 240-n. The document text corpus may include the text of one or more documents such as news articles, reports, documentary findings, stories, books, or any other types of documents.

At step 320, the computer server 210 accesses a database of pictorial representations 235. In embodiments, the pictorial summary program module 220 accesses or obtains the database of pictorial representations 235 from one or more of the external data servers 230, also in response to the request received at step 300 from the one of the user computing devices 240-1, 240-2, . . . , 240-n. The database of pictorial representations 235 includes a plurality of photos, images, clip art, sketches, and/or cartoons. Each of the photos, images, clip art, sketches, and/or cartoons in the database of pictorial representations 235 represents one or more topics. In embodiments, the database of pictorial representations 235 stores one or more keywords, in association with each of the photos, images, clip art, sketches, and/or cartoons, that identify the one or more topics represented.

At step 330, the computer server 210 trains models using natural language processing and deep learning based computer vision. In embodiments, the pictorial summary program module 220 uses the document text corpus acquired at step 310 and the database of pictorial representations 235 accessed at step 320 to train the models using natural language processing and deep learning based computer vision.

Figure 4:
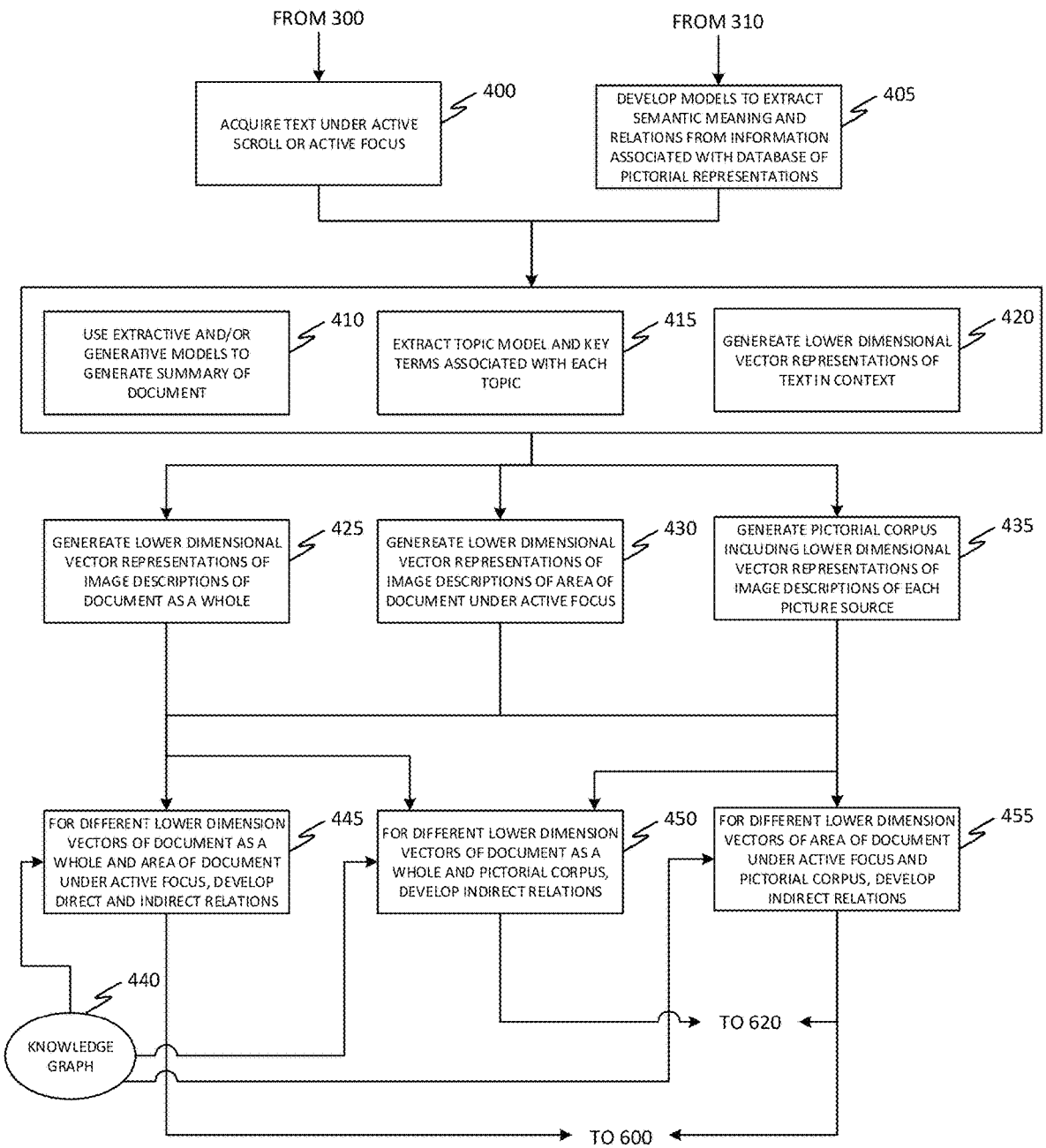
Figure 5:
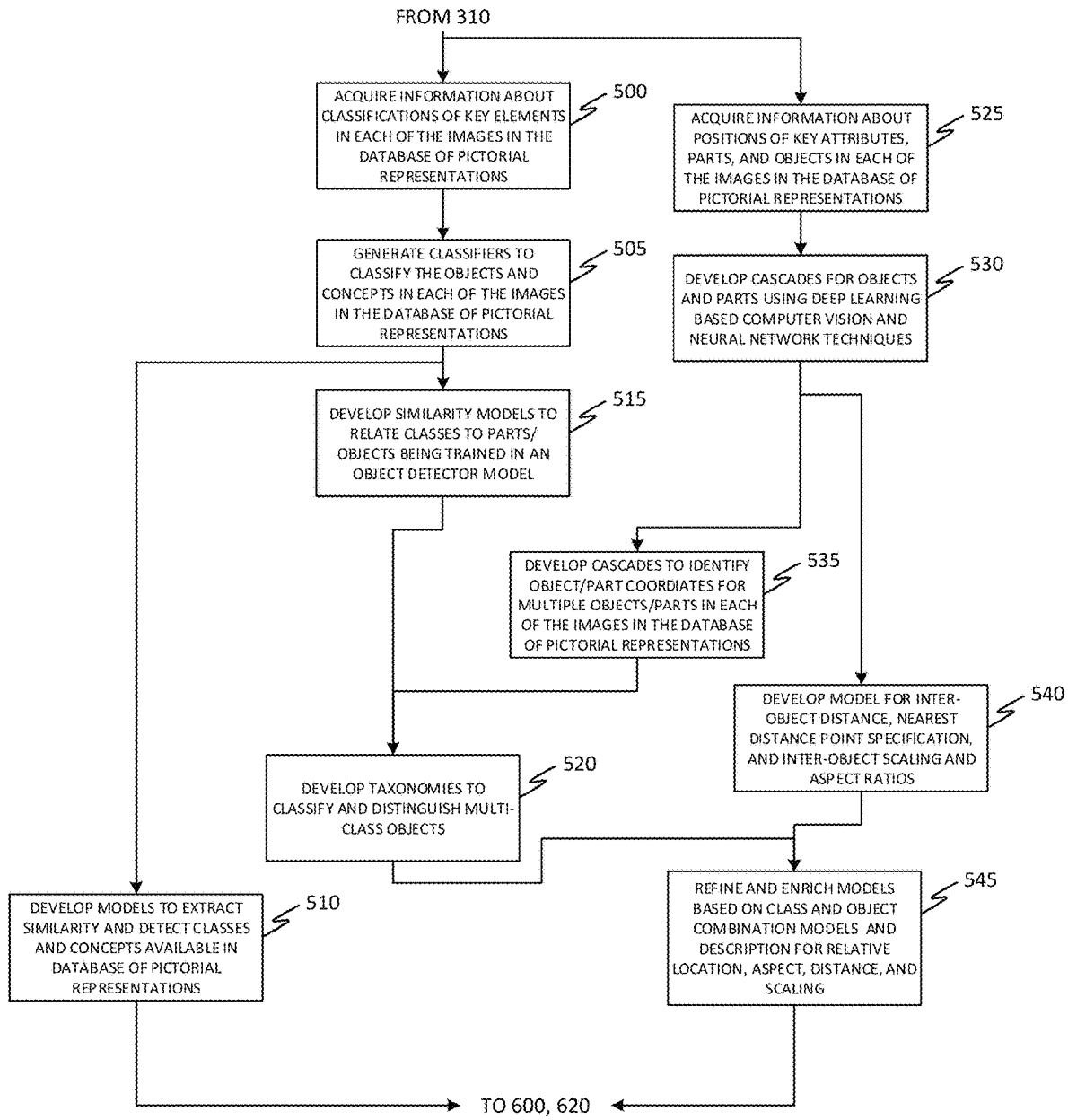

In embodiments, step 330 may be implemented using steps 400-455 of FIG. 4 and steps 500-535 of FIG. 5, described in greater detail herein. Implementations are not limited to these particular steps, however, and other computer-based techniques may be used to train the models at step 330.

At step 340, the computer server 210 generates a pictorial summary scene and causes it to be displayed, using the document user interface program module 250, by the one of the user computing devices 240-1, 240-2, . . . , 240-*n* that sent the request received at step 300. In embodiments, the pictorial summary program module 220 uses the models trained at step 330 to generate the pictorial summary scene for the document that is being displayed by the one of the user computing devices 240-1, 240-2, . . . , 240-*n* using the document user interface program module 250. The pictorial summary program module 220 then transmits the generated pictorial summary scene to the one of the user computing devices 240-1, 240-2, . . . , 240-*n* to be displayed using the document user interface program module 250.

Figure 6:
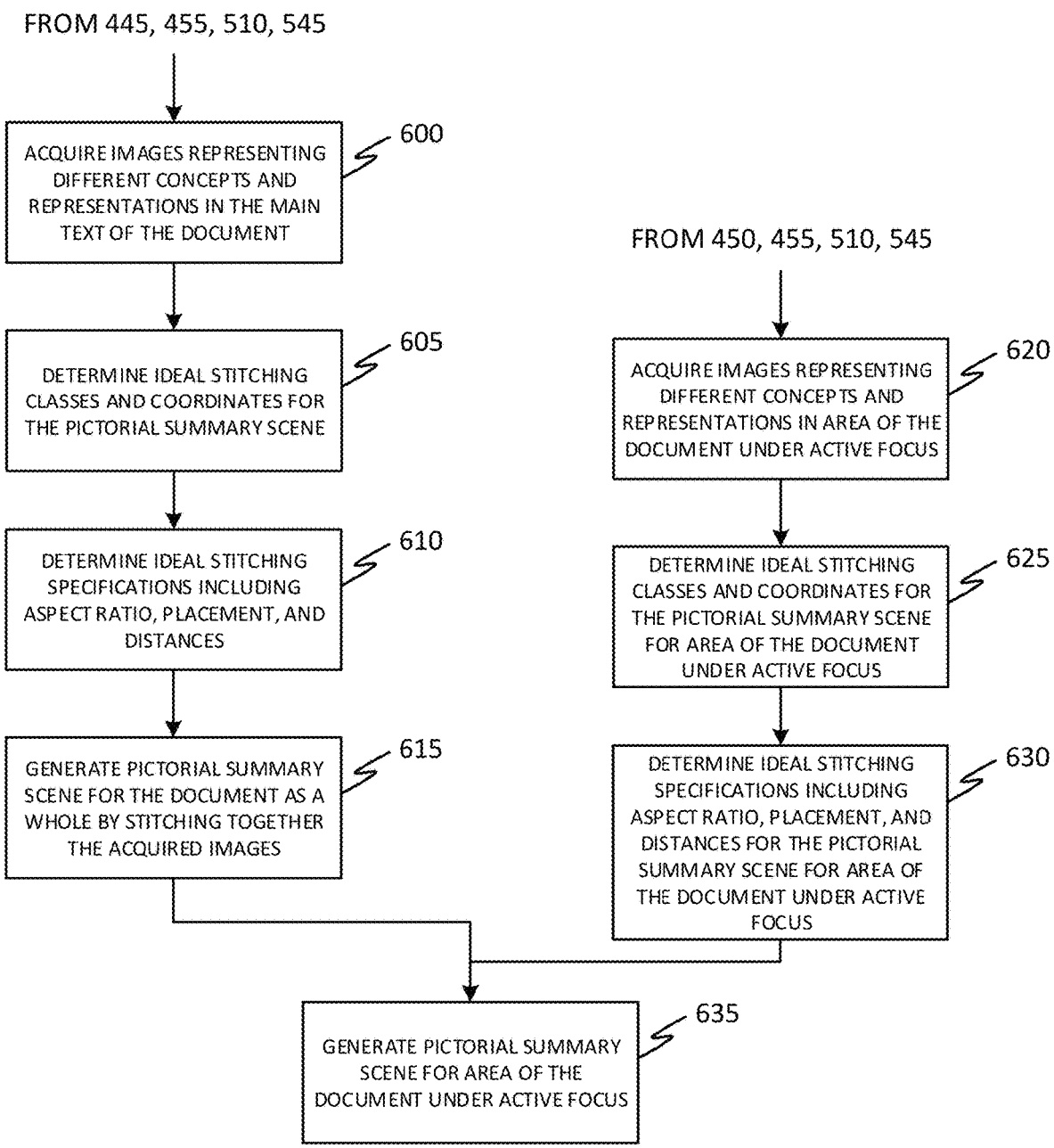

In embodiments, step 340 may be implemented using steps 600-635 of FIG. 6, described in greater detail herein. Implementations are not limited to these particular steps, however, and other computer-based techniques may be used to generate and display the pictorial summary scene at step 340.

At step 350, the computer server 210 determines whether or not the active focus of a graphical user interface of the one of the user computing devices 240-1, 240-2, . . . , 240-*n* has changed. In embodiments, the pictorial summary program module 220 determines whether or not a user of the one of the user computing devices 240-1, 240-2, . . . , 240-*n* has scrolled or moved a pointer/cursor to a different portion of a document that is being displayed on the one of the user computing devices 240-1, 240-2, . . . , 240-*n* using the document user interface program module 250. In embodiments, the pictorial summary program module 220 also determines whether or not the user has selected a portion of the pictorial summary scene that was generated at step 330 and is being displayed on the one of the user computing devices 240-1, 240-2, . . . , 240-*n* using the document user interface program module 250. If the active focus has changed (e.g., the pictorial summary program module 220 determines that the user scrolled or moved the pointer/cursor or selected a portion of the pictorial summary scene), then the flow proceeds to step 360. On the other hand, if the active focus has not changed, then the flow ends at step 370.

At step 360, the computer server 210 generates a pictorial summary scene for the new active focus and causes it to be displayed, using the document user interface program module 250, by the one of the user computing devices 240-1, 240-2, . . . , 240-*n*. In embodiments, the pictorial summary program module 220 generates the pictorial summary scene for the new active focus to represent a portion of the text document that is being actively viewed by the user (e.g., as determined based upon a scroll position in the document or based upon a cursor or pointer position indicating an active focus).

In embodiments, step 360 may be implemented using steps 600-635 of FIG. 6, described in greater detail herein. Implementations are not limited to these particular steps, however, and other computer-based techniques may be used to generate and display the pictorial summary scene for the new active focus at step 360.

In embodiments, the pictorial summary program module 220, in response to receiving information from the document user interface program module 250 indicating that a user has scrolled within a document, causes the pictorial summary scene displayed by the document user interface program module 250 to change gradually based upon the topic in the portion of the document that is being actively viewed. Accordingly, the pictorial summary program module 220 causes the visual representations of the previous topic to slowly fade into the background.

In other embodiments, in the case of a pictorial summary scene representing a plurality of documents, the pictorial summary program module 220 receives a user selection of one or more portions of the pictorial summary scene via the document user interface program module 250, drills down to filter on and retrieve the respective underlying documents represented by the selected portions, and generates an updated pictorial summary scene that is displayed to the user via the document user interface program module 250.

After the computer server 210 generates and displays the pictorial summary scene for the new active focus at step 360, the flow then returns to step 340.

Referring back to the example discussed above, for a document including terms such as cold drink, burger, fries, and adults, the pictorial summary scene generated and displayed at step 340 by the computer server 210 includes an image of an adult consuming burgers. In response to the user scrolling through the document to a subsequent portion that includes terms such as sedentary position, mobile, and video games, at step 350, the computer server 210 determines that the active focus has changed. In response to determining that the active focus has changed, at step 360, the computer server 210 generates and displays a pictorial summary scene for the new active focus that includes an image of a similar adult playing a mobile video game in his house with burgers on a table nearby.

FIG. 4 depicts a flowchart of an exemplary method in accordance with aspects of the invention. The steps of the method are performed in the environment of FIG. 2 and are described with reference to the elements shown in FIG. 2. Referring to FIG. 4, steps 400-455 illustrate exemplary steps that may be performed in training models using natural language processing techniques as described at step 330 of FIG. 3.

At step 400, the computer server 210 acquires the text under active scroll or active focus. In embodiments, the pictorial summary program module 220 receives information from the document user interface program module 250 that identifies a portion of a document displayed by the user interface program module 250 to which a user has scrolled, or a portion of a document having the active focus (e.g., a portion of the document under a mouse pointer or cursor or a selected portion of the document). The pictorial summary program module 220 then obtains the text from the portion of the document to which the user has scrolled (e.g., visible text at the scroll position, or a predetermined amount of text adjacent to the scroll position) or the portion of the document having the active focus, either from the document user interface program module 250 or from the document text corpus acquired at step 310 of FIG. 3.

At step 405, the computer server 210 develops models to extract semantic meaning and relations from the description, comments, metadata, alternative (alt) text, and other information associated with the database of pictorial representations 235 accessed at step 320 of FIG. 3. In embodiments, the pictorial summary program module 220 uses deep learning and cognitive computing based techniques including advanced natural language processing to perform the extraction of meaning and relations from the database of pictorial representations 235 accessed at step 320 of FIG. 3.

At step 410, the computer server 210 uses extractive and/or generative models to generate a summary of a document and, in the case of a corpus including a plurality of documents, a summary of the document in context with the other documents. In embodiments, the pictorial summary program module 220 uses deep learning and cognitive computing based techniques including advanced natural language processing and topic modeling to generate the document summary using the documents in the document text corpus acquired at step 310 of FIG. 3 and the database of pictorial representations 235 accessed at step 320 of FIG. 3, using extractive and/or generative models.

At step 415, the computer server 210 uses deep learning and cognitive computing based techniques including advanced natural language processing and latent Dirichlet allocation (LDA) and latent semantic analysis (LSA) to extract a topic model and key terms associated with each topic using a pre-determined or dynamic threshold. In embodiments, the pictorial summary program module 220 extracts the topic model and key terms from the documents in the document text corpus acquired at step 310 of FIG. 3.

At step 420, the computer server 210 generates lower dimensional vector representations of the text in context using deep learning models and an unsupervised machine learning algorithm that generates vectors for sentences, paragraphs, and documents, such as doc2vec. In embodiments, the pictorial summary program module 220 uses deep learning and cognitive computing based techniques including the doc2vec algorithm to generate a document vector for each document in the document text corpus acquired at step 310 of FIG. 3.

At step 425, the computer server 210 generates lower dimensional vector representations of image descriptions of the document as a whole with respective statistical weightage and relationships with other concepts in the document. In embodiments, the pictorial summary program module 220 uses deep learning and cognitive computing based techniques including advanced natural language processing and an unsupervised machine learning algorithm that generates vectors for sentences, paragraphs, and documents, such as doc2vec, to generate the lower dimensional vector representations using the documents in the document text corpus acquired at step 310 of FIG. 3.

At step 430, the computer server 210 generates lower dimensional vector representations of image descriptions of an area of the document displayed by the user interface program module 250 that is under active focus (e.g., as determined based upon a scroll position in the document or based upon a cursor or pointer position indicating an active focus) with respective statistical weightage and relationships with other concepts in the document. In embodiments, the pictorial summary program module 220 uses deep learning and cognitive computing based techniques including advanced natural language processing and an unsupervised machine learning algorithm that generates vectors for sentences, paragraphs, and documents, such as doc2vec, to generate the lower dimensional vector representations using the documents in the document text corpus acquired at step 310 of FIG. 3.

At step 435, the computer server 210 generates a pictorial corpus that includes lower dimensional vector representations of image descriptions (e.g., keywords) of each portion of the representation of each picture source in the database of pictorial representations 235. In embodiments, the pictorial summary program module 220 uses deep learning and cognitive computing based techniques including advanced natural language processing and an unsupervised machine learning algorithm that generates vectors for sentences, paragraphs, and documents, such as doc2vec, to generate the lower dimensional vector representations using the database of pictorial representations 235 accessed at step 320 of FIG. 3.

At step 445, for different lower dimension vectors of the document as a whole (generated at step 425) and different lower dimension vectors of the area of the document under active focus (generated at step 430), the computer server 210 develops direct and indirect relations between vectors. In embodiments, the pictorial summary program module 220 uses the document displayed by the user interface program module 250 to determine the direct relations between vectors and uses a knowledge graph 440 (e.g., a structured collection of facts used in cognitive computing, including for abstracting the domain knowledge and mapping to the visual graph base) and the acquired document text corpus from step 310 of FIG. 3 to determine the indirect relations between vectors, using deep learning and cognitive computing based techniques including advanced natural language processing. Based on these direct and indirect relations, the pictorial summary program module 220 generates linkages and weightages of linking relations. The pictorial summary program module 220 also develops sequences of linking relations.

At step 450, for different lower dimension vectors of the document as a whole (generated at step 425) and different lower dimension vectors of the pictorial corpus (generated at step 435), the computer server 210 develops indirect relations between vectors. In embodiments, the pictorial summary program module 220 uses the knowledge graph 440 and the acquired document text corpus from step 310 of FIG. 3 to determine the indirect relations between vectors, using deep learning and cognitive computing based techniques including advanced natural language processing. Based on these indirect relations, the pictorial summary program module 220 generates linkages and weightages of linking relations. The pictorial summary program module 220 also develops sequences of linking relations.

At step 455, for different lower dimension vectors of the area of the document under active focus (generated at step 430) and different lower dimension vectors of the pictorial corpus (generated at step 435), the computer server 210 develops indirect relations between vectors. In embodiments, the pictorial summary program module 220 uses the knowledge graph 440 and the acquired document text corpus from step 310 of FIG. 3 to determine the indirect relations between vectors, using deep learning and cognitive computing based techniques including advanced natural language processing. Based on these indirect relations, the pictorial summary program module 220 generates linkages and weightages of linking relations. The pictorial summary program module 220 also develops sequences of linking relations.

FIG. 5 depicts a flowchart of an exemplary method in accordance with aspects of the invention. The steps of the method are performed in the environment of FIG. 2 and are described with reference to the elements shown in FIG. 2. Referring to FIG. 5, steps 500-545 illustrate exemplary steps that may be performed in training models using deep learning based computer vision as described at step 330 of FIG. 3.

At step 500, the computer server 210 acquires information about classifications of key elements in each of the images in the database of pictorial representations 235 accessed at step 320 of FIG. 3. In embodiments, the pictorial summary program module 220 acquires the information about classifications from the external data servers 230.

At step 505, the computer server 210 generates classifiers to classify the objects and concepts in each of the images in the database of pictorial representations 235 with weightages of different classes representing concepts. In embodiments, the pictorial summary program module 220 uses machine learning and visual analytics techniques including convolutional neural networks and deep learning based computer vision to classify the objects and concepts into the different classes.

At step 510, the computer server 210 develops models to extract similarity and detect classes and concepts available in the database of pictorial representations. In embodiments, the pictorial summary program module 220 uses deep learning based computer vision to extract similarity and detect classes and concepts.

At step 515, the computer server 210 develops similarity models to relate classes (and the concepts represented by the classes) to parts/objects being trained in an object detector model. In embodiments, the pictorial summary program module 220 uses deep learning based computer vision including convolutional neural networks to develop the similarity models.

At step 520, the computer server 210 develops taxonomies to classify and distinguish multi-class objects. In embodiments, the pictorial summary program module 220 uses deep learning based computer vision to develop taxonomies. For example, a doctor is classified as a person and a human hand is classified as an object. A doctor's hand is considered to be a multi-class object since it is in both the person and object classes.

At step 525, the computer server 210 acquires information about positions of key attributes, parts, and objects in each of the images in the database of pictorial representations 235 accessed at step 320 of FIG. 3. In embodiments, the pictorial summary program module 220 acquires information about spatial positions of key attributes, parts, and objects within each of the images in the database of pictorial representations 235 using deep learning based computer vision.

At step 530, the computer system 210 develops cascades for objects and parts using deep learning based computer vision and neural network techniques such as regional convolutional neural networks (R-CNN), Haar classifiers, and local binary pattern (LBP) cascades. In embodiments, the pictorial summary program module 220 develops the cascades using the information acquired in step 525 about positions of key attributes, parts, and objects in each of the images in the database of pictorial representations. In this manner, the pictorial summary program module 220 uses the images in the database of pictorial representations 235 to train the models to identify different objects and parts in the images in the database of pictorial representations 235.

At step 535, the computer system 210 develops cascades to identify the object/part coordinates for multiple objects/parts in each of the images in the database of pictorial representations 235 accessed at step 320 of FIG. 3. In embodiments, the pictorial summary program module 220 uses deep learning based computer vision and neural network techniques such as R-CNN, Haar classifiers, and LBP cascades to develop the cascades to identify the object/part coordinates. In this manner, the pictorial summary program module 220 uses the images in the database of pictorial representations 235 to train the models to identify the coordinates of the objects/parts in the images in the database of pictorial representations 235.

At step 540, the computer system 210 develops a model for inter-object distance, nearest distance point specification, and inter-object scaling and aspect ratios. In embodiments, the pictorial summary program module 220 uses deep learning based computer vision and the object/part coordinates for multiple objects/parts in each of the images in the database of pictorial representations 235 to develop the model for inter-object distance, nearest distance point specification, and inter-object scaling and aspect ratios.

At step 545, the computer system 210 refines and enriches the models based on class and object combination models and description for relative location, aspect, distance, and scaling. In embodiments, the pictorial summary program module 220 uses deep learning based computer vision and cognitive computing techniques to refine and enrich the similarity model developed at step 515, the taxonomies developed at step 520, and the model for inter-object distance, nearest distance point specification, and inter-object scaling and aspect ratios developed at step 540.

FIG. 6 depicts a flowchart of an exemplary method in accordance with aspects of the invention. The steps of the method are performed in the environment of FIG. 2 and are described with reference to the elements shown in FIG. 2. Referring to FIG. 6, steps 600-635 illustrate exemplary steps that may be performed in generating and displaying the pictorial summary scene as described at step 340 of FIG. 3.

At step 600, the computer system 210 acquires images representing different concepts and representations in the main text of a document displayed by the user interface program module 250. In embodiments, the pictorial summary program module 220 uses the vector relations generated at steps 445, 450, and 455 as well as cognitive computing techniques to select images representing different concepts and representations in the main text from the pictorial corpus.

At step 605, the computer system 210 determines ideal stitching classes and their coordinates for the pictorial summary scene. In embodiments, the pictorial summary program module 220 uses the acquired images from step 600 and the models from step 545 to determine the classes (from step 505) to use in the pictorial summary scene as well as the coordinates at which to stitch (e.g., merge) images representing the classes into the pictorial summary scene.

At step 610, the computer system 210 determines ideal stitching specifications including aspect ratio, placement, and distances. In embodiments, the pictorial summary program module 220 uses the acquired images from step 600 and the models from steps 510 and 545 to determine the aspect ratio and the placement (including distance from other images) for the images representing the classes to be stitched into the pictorial summary scene.

At step 615, the computer system 210 generates the pictorial summary scene for the document (that is displayed by the user interface program module 250) as a whole by stitching (e.g., merging) together the acquired images from step 600 according to the classes and coordinates determined at step 605 and the specifications including aspect ratio, placement, and distances determined at step 615.

At step 620, the computer system 210 acquires images representing different concepts and representations in an area of the document under active focus in the user interface program module 250. In embodiments, the pictorial summary program module 220 uses the vector relations generated at steps 445, 450, and 455 as well as cognitive computing techniques to select images representing different concepts and representations in the area of the document under active focus from the pictorial corpus.

At step 625, the computer system 210 determines ideal stitching classes and their coordinates for the pictorial summary scene for the area of the document under active focus. In embodiments, the pictorial summary program module 220 uses the acquired images from step 620 and the models from step 545 to determine the classes (from step 505) to use in the pictorial summary scene as well as the coordinates at which to stitch (e.g., merge) images representing the classes into the pictorial summary scene.

At step 630, the computer system 210 determines ideal stitching specifications including aspect ratio, placement, and distances for the pictorial summary scene for the area of the document under active focus. In embodiments, the pictorial summary program module 220 uses the acquired images from step 620 and the models from steps 510 and 545 to determine the aspect ratio and the placement (including distance from other images) for the images representing the classes to be stitched into the pictorial summary scene.

At step 635, the computer system 210 generates the pictorial summary scene for the area of the document under active focus by stitching together the acquired images from step 620 according to the classes and coordinates determined at step 625 and the specifications including aspect ratio, placement, and distances determined at step 630.

Figure 7:
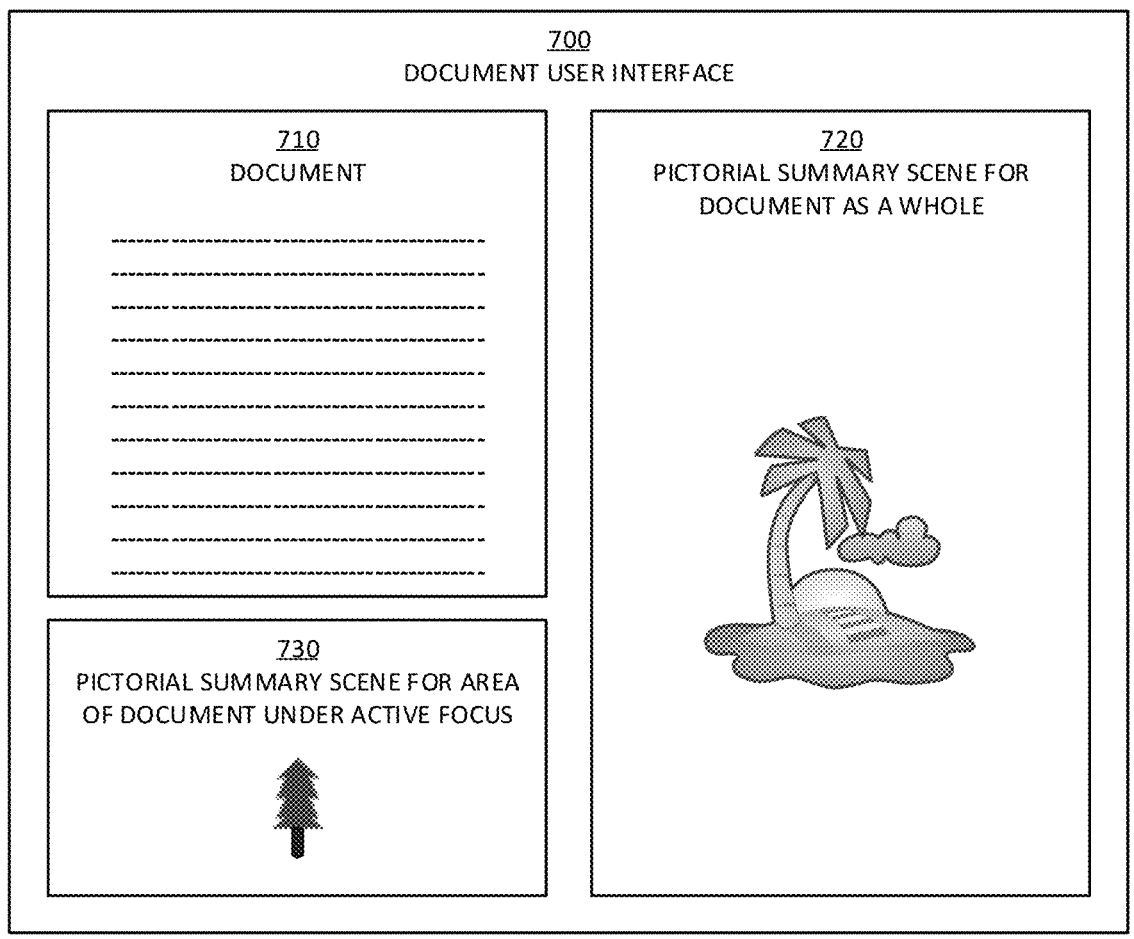
FIG. 7 depicts an illustrative example of a document user interface in accordance with aspects of the invention.

FIG. 7 depicts an illustrative example of a document user interface 700 displayed on a display of a user computing device 240-1, 240-2, . . . , 240-n by the document user interface program module 250 (of FIG. 2) in accordance with aspects of the invention. The document user interface 700 displays a document 710 as well as a pictorial summary scene 720 for the document as a whole generated by the pictorial summary program module 220.

Additionally, the document user interface 700 displays a pictorial summary scene 730 for the area of the document under active focus. The pictorial summary scene 730 for the area of the document under active focus may be placed in a dedicated widget or position. In other embodiments, the pictorial summary scene 730 for the area of the document under active focus is overlaid or overlapped over the document 710 and may be partially transparent.

As a user scrolls within the document 710, the pictorial summary scene 730 for the area of the document under active focus changes gradually based upon the topic in the portion of the document 710 that is being actively viewed. In embodiments, the visual representations of the previous topic slowly fade into the background.

In other embodiments, the pictorial summary program module 220 generates multiple pictorial summary scenes (not depicted) that are displayed in an ordered sequence. Each of the multiple pictorial summary scenes summarizes a topic appearing in a particular portion of a document. Alternatively, in the case of a corpus including a plurality of documents, each of the multiple pictorial summary scenes (not depicted) summarizes a topic in a particular document in the corpus.

In still other embodiments, the pictorial summary program module 220 generates transitions between the multiple pictorial summary scenes to generate a story video, animation, or cartoon. Alternatively, in the case in which the pictorial summary program module 220 generates a single pictorial summary scene 730 for a portion of a document (e.g., document 710) under active view, as the portion of the document under active view changes, the pictorial summary program module 220 may generate a transition (e.g., a video fade) between the pictorial summary scene and an updated pictorial summary scene corresponding to the new portion of the document under active view, to generate a story video, animation, or cartoon. Accordingly, the computer server 210 continuously and dynamically updates the pictorial summary scene.

In embodiments, the pictorial summary program module 220 generates pictorial summary scenes summarizing an entire webpage, an entire website, and/or content underlying one or more menu items or hyperlinks on the website. In other embodiments, the pictorial summary program module 220 generates pictorial summary scenes summarizing the underlying web pages appearing in search results. In still other embodiments, the pictorial summary program module 220 generates a pictorial summary scene summarizing all of the files in a folder/sub-folder which contain textual content.

In embodiments, the systems and methods described above are used to cognitively generate a pictorial summary of a portion of document under active view, real time scroll, and active focus. Accordingly, a pictorial summary is generated of a portion of a text document under real time scroll, active view, and active focus. Additionally, in embodiments, the systems and methods described above are used to create a cognitive summary scene using multiple discrete summary scenes, placed in an ordered sequence to create video and animations.

In embodiments, the systems and methods described above are used to create continuous dynamically updating summary scenes and discrete multiple summary scenes in addition to a single summary scene. In an example, a novel is treated as a corpus of text which tells a story. The concepts, entities, and their relations in this story are not static but instead change throughout the text. In another example, with a general text document, topic drift may be present in a homogenous text. In a non-homogenous text, separate topics may be present. Accordingly, a single summary scene for these texts may be overly busy (i.e., including too many elements) and may not effectively describe the changing topics in the texts. Accordingly, a single summary scene may not describe all of the sequences in the texts and may not accurately describe the story. This problem is resolved by the discreet multiple summary scenes generated and presented in an ordered sequence according to an embodiment. These discreet multiple summary scenes may be presented in a manner similar to a comic. In other embodiments, the discreet multiple summary scenes may be transitioned with various framerates to generate a story video, an animation, or cartoons.

In embodiments, the systems and methods described above are used to create linked and overlapping scenes where the scene retains newer concepts, entities, and their relations and gradually phases out older entities, concepts, and their relations. Accordingly, meaningful sequences of scenes and meaningful videos and animations are generated. The systems and methods described above are also used to create continuous dynamically updating summary scene sequences.

In embodiments, the systems and methods described above use extractive/generative models to generate a summary of the document by extracting key terms/concepts from the document. Additionally, in embodiments, the systems and methods described above are used to acquire images representing different concepts and representations from the text and establish ideal stitching classes/coordinates as per the text summary. Additionally, in embodiments, the systems and methods described above are used to stitch the main document summary scene by utilizing the acquired images representing different concepts and stitching classes as per the text summary.

In embodiments, the systems and methods described above are used to drill down on a cognitive summary scene to filter on and retrieve the respective underlying text documents. For example, if the scene representing the topics from a corpus comprises representations of disparate topics extracted from a multitude of documents representing various sub-topics and stitched into a unified whole based on the importance of each, a user may select one or more discrete or contagious aspects of this scene to filter down to different documents representing the selection.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining, by a computing device, a document comprising textual content;
   training, by the computing device, computer models using natural language processing and deep learning based computer vision;
   acquiring, by the computing device, images representing concepts in the textual content of the document;
   creating, by the computing device, a first pictorial summary scene that summarizes the textual content of the document using the computer models and by merging the images representing concepts in the textual content of the document;
   obtaining, by the computing device, information indicating a user's current position in the textual content of the document;
   creating, by the computing device, a second pictorial summary scene that summarizes a portion of the textual content of the document adjacent to the user's current position;
   obtaining, by the computing device, information indicating a new position of the user in the textual content of the document;
   creating, by the computing device, a third pictorial summary scene that summarizes a portion of the textual content of the document adjacent to the new position of the user in the document; and
   creating, by the computer device, a video transition between the second pictorial summary scene and the third pictorial summary scene,
   wherein the video transition results in a portion of the second pictorial summary scene being included in the third pictorial summary scene, the portion being represented in a less prominent way in the third pictorial summary scene than in the second pictorial summary scene.

2. The method according to claim 1, wherein the information indicating the user's current position in the textual content of the document is a scroll position in the document.

3. The method according to claim 1, wherein the information indicating the user's current position in the textual content of the document is a cursor position or pointer position in the document.

4. The method according to claim 1, further comprising accessing, by the computing device, a database of pictorial representations,
   wherein the first pictorial summary scene is created by stitching together the images representing concepts in the textual content of the document which comprise a plurality of photos, images, clip art, sketches, cartoons, or combinations thereof from the database of pictorial representations.

5. The method according to claim 1, further comprising creating, by the computing device, a plurality of additional pictorial summary scenes in an ordered sequence, each of the plurality of additional pictorial summary scenes summarizing a particular portion of the document.

6. The method according to claim 1, further comprising determining stitching specifications including an aspect ratio and placement for the images representing concepts in the textual content of the document, and
   wherein the first pictorial summary scene is created by merging the images representing concepts in the textual content of the document according to the determined stitching specifications including the aspect ratio and the placement.

7. A computer program product comprising a computer readable storage medium having program instructions embodied therewith, the program instructions executable by a computing device to cause the computing device to:
   obtain a document comprising textual content;
   obtain information indicating a current user position in the textual content of the document;
   train computer models using natural language processing and deep learning based computer vision;
   acquire images representing concepts in the textual content of the document;
   create a first pictorial summary scene that summarizes the textual content of the document using the computer models and by merging the images representing concepts in the textual content of the document;
   acquire images representing concepts in a portion of the textual content of the document adjacent to the current user position;
   create a second pictorial summary scene that summarizes the portion of the textual content of the document adjacent to the current user position using the computer models and by merging the images representing concepts in the portion of the textual content of the document adjacent to the current user position;

obtain information indicating a new position in the textual content of the document; and create a third pictorial summary scene that summarizes a portion of the textual content of the document adjacent to the new position; and create a video transition between the second pictorial summary scene and the third pictorial summary scene, wherein the video transition results in a portion of the second pictorial summary scene being included in the third pictorial summary scene, the portion being represented in a less prominent way in the third pictorial summary scene than in the second pictorial summary scene.

8. The computer program product according to claim 7, wherein the information indicating the current user position in the textual content of the document is a scroll position in the document.

9. The computer program product according to claim 7, wherein the information indicating the current user position in the textual content of the document is a cursor position or pointer position in the document.

10. The computer program product according to claim 7, the program instructions further being executable by the computing device to cause the computing device to obtain a database of pictorial representations, wherein the first pictorial summary scene and the second pictorial summary scene are created by stitching together the images representing concepts in the textual content of the document and the images representing concepts in the portion of the textual content of the document adjacent to the current user position, respectively, each of which comprise a plurality of photos, images, clip art, sketches, cartoons, or combinations thereof from the database of pictorial representations.

11. The computer program product according to claim 7, wherein the second pictorial summary scene is overlaid on the document and is partially transparent.

12. A system comprising:

a hardware processor, a computer readable memory, and a computer readable storage medium associated with a computing device;

program instructions configured to obtain a document comprising textual content;

program instructions configured to train computer models using natural language processing and deep learning based computer vision;

program instructions configured to acquire images representing concepts in the textual content of the document;

program instructions configured to create a first pictorial summary scene that summarizes the textual content of the document using the computer models and by merging the images representing concepts in the textual content of the document;

program instructions configured to obtain information indicating a current user position in the textual content of the document;

program instructions configured to create a second pictorial summary scene that summarizes a portion of the textual content of the document adjacent to the current user position;

program instructions configured to obtain information indicating a new position of the user in the textual content of the document;

program instructions configured to create a third pictorial summary scene that summarizes a portion of the textual content of the document adjacent to the new position of the user; and program instructions configured to create a video transition between the second pictorial summary scene and the third pictorial summary scene, wherein the video transition results in a portion of the second pictorial summary scene being included in the third pictorial summary scene, the portion being represented in a less prominent way in the third pictorial summary scene than in the second pictorial summary scene, and wherein the program instructions are stored on the computer readable storage medium for execution by the hardware processor via the computer readable memory.

* * * * *